(12) United States Patent
Crinklaw et al.

(10) Patent No.: US 12,504,757 B2
(45) Date of Patent: Dec. 23, 2025

(54) AUTONOMOUS VEHICLE SAFETY SYSTEM AND METHOD (71) Applicant: GUSS Automation LLC, Kingsburg, CA (US)

(72) Inventors: David Crinklaw, Kingsburg, CA (US); Chase Schapansky, Fresno, CA (US); Gary Thompson, Sanger, CA (US)

( * ) Notice: Subject to any disclaimer, the term of this patent is extended or adjusted under 35 U.S.C. 154(b) by 158 days.

(21) Appl. No.: 17/195,387

(22) Filed: Mar. 8, 2021

(65) Prior Publication Data

US 2022/0283582 A1 Sep. 8, 2022

(51) Int. Cl.
*G05D 1/00* (2024.01)
*H04W 4/80* (2018.01)
*H04W 4/90* (2018.01)

(52) U.S. Cl.
CPC ......... *G05D 1/0077* (2013.01); *G05D 1/0022* (2013.01); *G05D 1/028* (2013.01); *H04W 4/80* (2018.02); *H04W 4/90* (2018.02)

(58) Field of Classification Search
CPC .... G05D 1/0022; G05D 1/028; G05D 1/0055; G05D 2201/02; H04W 4/80; H04W 4/90
See application file for complete search history.

(56) References Cited

U.S. PATENT DOCUMENTS

| | | | |
|---|---|---|---|
| 2010/0063652 A1* | 3/2010 | Anderson | G08C 17/02 235/494 |
| 2014/0043168 A1 | 2/2014 | Schaible et al. | |
| 2016/0007140 A1* | 1/2016 | Yae | H04W 4/80 455/41.2 |
| 2017/0100838 A1* | 4/2017 | Lewis | B25J 9/1676 |
| 2017/0151668 A1* | 6/2017 | Boesen | B25J 9/1674 |
| 2017/0305398 A1* | 10/2017 | Ko | B60T 7/122 |
| 2018/0150206 A1* | 5/2018 | Suzuki | G06F 3/04842 |
| 2018/0201132 A1* | 7/2018 | Cherney | B60K 28/066 |
| 2019/0155278 A1* | 5/2019 | Idbrant | G01S 5/0284 |
| 2019/0248329 A1* | 8/2019 | Eriksen | B60R 25/209 |
| 2019/0322274 A1* | 10/2019 | Droz | B60W 60/0017 |
| 2021/0347216 A1* | 11/2021 | Robertson | G07C 5/0841 |

FOREIGN PATENT DOCUMENTS

TW M460809 U * 9/2013

OTHER PUBLICATIONS

English Translation of TW M460809 U (Year: 2013).*

* cited by examiner

*Primary Examiner* — Faris S Almatrahi
*Assistant Examiner* — Moises Gasca Alva
(74) *Attorney, Agent, or Firm* — WHGC, P.L.C.; Alexander R. Schlee (57) ABSTRACT

An autonomous vehicle safety system, a method of operating the same and an autonomous vehicle equipped with the autonomous vehicle safety system. An autonomous vehicle Bluetooth receiver is connected in a signal transmitting fashion to the engine control unit of an autonomous vehicle. Upon receiving a signal from a remote Bluetooth transmitter at a predefined proximity distance between the transmitter and the receiver, a microcontroller connected to the receiver actuates a relay switch disabling the engine control unit. The engine control unit may then also engage the vehicle breaks, lock the steering in place, and only after not receiving a proximal Bluetooth signal for a particular time span, enable again the autonomous vehicle operating mode.

9 Claims, 7 Drawing Sheets

AUTONOMOUS VEHICLE SAFETY SYSTEM AND METHOD

BACKGROUND OF THE INVENTION

1. Field of the Invention

The present in invention pertains to proximity sensor safety systems, in general, specifically Bluetooth sensor systems for autonomous vehicles. More specifically, the invention pertains to an autonomous vehicle safety system, a method of operating the same and an autonomous vehicle equipped with the autonomous vehicle safety system.

2. Background Technology

Autonomous vehicles pose potential hazards to human safety, particularly since such machines are limited in their ability to detect potential hazards. This is particularly true when a person is located in a blind spot or underneath the machine. Furthermore, even if a machine is not moving but is still running, a vehicle may start moving unexpectedly and cause bodily harm to a person. For example, the vehicle may be actuated by an individual remote from the vehicle, and unaware of any people in the vicinity. Especially at risk are people who work in the field or service the vehicle who regularly are in proximity to such vehicles. Therefore, what is needed is a safety system operable to effect an emergency shut off of a machine when detecting people in the vicinity of the machine and continue keeping the autonomous vehicle disabled as long as people remain in a certain vicinity of the vehicle.

Previous safety equipment of this kind have utilized RFID sensors, which unfortunately have various shortcomings that compromise the practicable from a safety standpoint. First, RFID sensors are limited in what area they are able to cover. While this is not problematic when the autonomous vehicle is running but stationary, this creates safety concerns when the vehicle is moving. An autonomous vehicle depending on various factors such as velocity, terrain, and weight, requires timely sensing to reduce speed enough to minimize damage, or ideally avoid collision altogether. A sensor lacking sufficient range can therefore pose a substantial safety hazard. Additionally, these RFID systems are limited by their battery requirements, which are required to be charged at least once a week, if not even more frequently. This requires regular attention to ensure that the sensors are charged and operating properly. Importantly, this creates a heightened probability of the battery being drained at times where machine shutdown is needed, negating the utility of this safety feature. The range and battery life of RFID systems are inversely proportional, such that battery life is short when range is high and range is too low to cover the vehicle when battery life is long.

Additionally, RFID sensors are typically specialty sensors that cannot be freely configured, allowing receiving only specific transmitter signals from specific transmitters, which means that it only works to shut down and keeping an autonomous vehicle disabled when in the vicinity of the specific people equipped with that specific transmitter. This limits functionality, in contrast with the utilization of Bluetooth as in the present invention which allows individuals to be protected by transmitting any Bluetooth signal, for example from a cell phones persons carry. For instance, bystanders such as people who are curious about the autonomous vehicle may approach it and be put in danger as a result. Since many people have a Bluetooth-enabled cell phone on them at all times, utilization of Bluetooth signal sensing technology can protect unsuspecting individuals coming in the vicinity of the vehicle.

SUMMARY OF THE INVENTION

It is an object of the invention provide for an emergency shut off by an autonomous vehicle safety system, a method of operating the autonomous vehicle safety system and an autonomous vehicle configured for the purpose of reducing the likelihood of human injury, animal injury and further preventing damage to the autonomous vehicle or other objects.

According to a first aspect of the invention, an autonomous vehicle safety system comprises an autonomous vehicle Bluetooth receiver that is connectable in a signal transmitting fashion to the engine control unit of an autonomous vehicle; a remote Bluetooth transmitter configured to send a Bluetooth transmitter signal to the Bluetooth receiver, wherein the Bluetooth receiver is configured to receive the Bluetooth transmitter signal up to a specified distance from the remote Bluetooth transmitter; and a microcontroller connectable to the autonomous vehicle Bluetooth receiver and configured to actuate a relay switch disabling the engine control unit upon receipt of a remote Bluetooth transmitter signal by the Bluetooth receiver.

According to a second aspect of the invention, a method of operating an autonomous vehicle safety system for proximity-based disabling of an autonomous vehicle including a receiver configured to receive a Bluetooth signal comprises (a) detecting a proximate Bluetooth signal; (b) upon receiving a proximate Bluetooth signal, triggering an autonomous vehicle disabling module, including applying brakes, shifting drive to neutral, and locking steering in place; (c) after having established the autonomous vehicle disabling module, scanning by a receiver in time intervals for receiving the proximate Bluetooth signals; (d) starting a counter counting a predefined number of signal scans for detecting the presence of the proximal Bluetooth signal; (e) after not having detected a proximal Bluetooth signal over a predetermined number of signal scans, resetting steering to a default position and enabling command input.

According to a third aspect of the invention an autonomous vehicle comprises an engine control unit; a Bluetooth receiver that is connected in a signal transmitting fashion to the engine control unit of an autonomous vehicle and configured to receive a signal from a remote Bluetooth transmitter up to a specified distance between the remote Bluetooth transmitter and the receiver; and a microcontroller connected to the autonomous vehicle Bluetooth receiver and configured to actuate a relay switch disabling the engine control unit upon receipt of a remote Bluetooth transmitter signal by the autonomous vehicle Bluetooth receiver.

DETAILED DESCRIPTION OF THE INVENTION

Figure 1A:
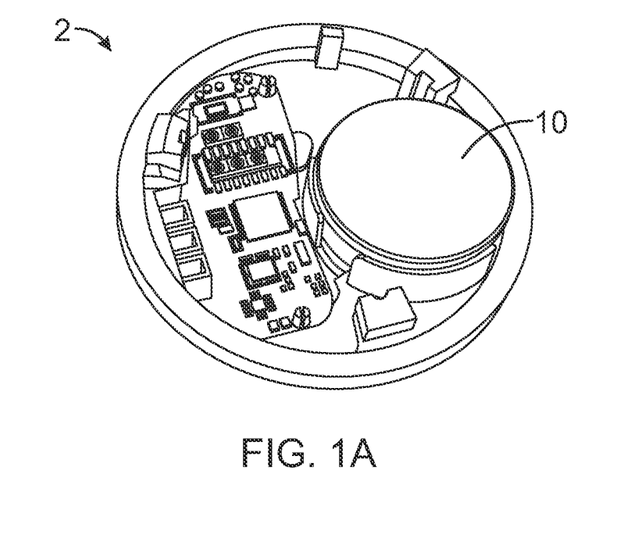
FIG. 1a shows the inside of a Bluetooth signal transmitter.
Figure 1B:
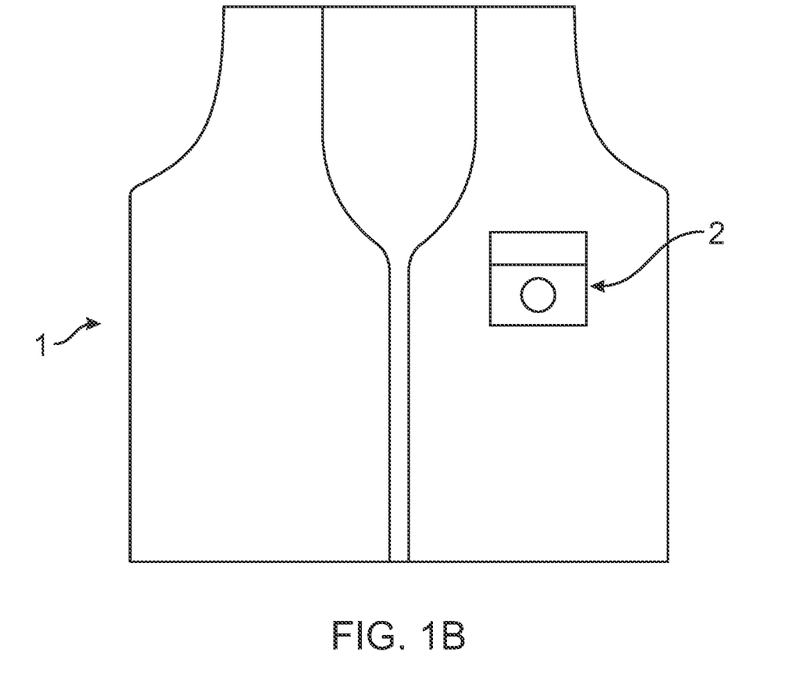
FIG. 1b shows a front view of a safety vest accommodating a transmitter in a chest pocket.

FIG. 1 shows a safety vest 1 accommodating a transmitter 2. According to this preferred embodiment, accommodating the transmitter 2 is a vest 1 that is chosen for such purpose due to the vests versatility in a wide variety of environments and temperatures. For instance, vests are often lightweight making them practical for hot climates, while simultaneously being loose enough to layer over jackets in colder temperatures. Safety vests are also commonly provided in high visibility colors with reflective elements, allowing for operators to notice people in the field.

Since safety vests 1 are a staple in many outdoor workplaces, the transmitter 2 can be formed to be accommodated in any standard safety vest 1 with pockets or compartments. In other embodiments, the safety vest 1 can be specially equipped with compartments suited to house the transmitter 2. Standard Bluetooth beacons are available on the market, meeting the specifications of being easily accommodated as the Bluetooth signal transmitter in a chest compartment of a safety vest, as shown in FIG. 1.

It is advantageous for the transmitter 2 to be housed in the garment in a comfortable manner as not to disincentivize users from wearing their safety vest. One potential source of discomfort is the shifting of the transmitter 2 within the housing compartment, which can create a fluctuating distribution in the weight of the garment. Thus, it is preferred that the housing compartment be formed in proportions that mirror approximately that of the transmitter 2. A further potential source of discomfort may stem from uneven distribution of weight caused by the transmitter 2 being housed on one side of the garment but not the other. However, in comparison to RFID transmitters, relatively light weight Bluetooth beacons as transmitters 2 are available, also overcoming weight related problems due to being of sufficiently light weight.

The transmitter 2 can be affixed to a wearable housing such as a vest in a variety of ways. In some embodiments, Velcro can be utilized to secure the transmitter unit in place within the garment. In other embodiments the transmitter 2 can be sewed into a garment in a compartment specifically suited for seamless integration of the transmitter 2 into the garment.

In one embodiment, the wearable garment can house two transmitter units, one in the front of the garment and another at the back of the garment. This allows for a greater connection between the transmitter 2 and receiver 4, reducing instances in which a signal is not picked up due to interference by the wearer's body.

The transmitter 2 can include adjustable range of transmission to be customized to be specific demands of a site. Too great of a range can result in inadvertent disabling of the vehicle.

The transmitter 2 utilizes Bluetooth low-energy technology. In a preferred embodiment the battery 10 has enough capacity to require change only once a year, such as a small CR2032 battery. The transmitter 2 can be a hockey puck shaped unit with example dimensions of a diameter of 2 inches and a thickness of 0.5 inches.

Each transmitter unit can be identifiable by a given identification number or code which can be read by the receiver device on the autonomous vehicle 3. This enables the receiver 4 to distinguish between signals sent from the fleet of transmitters 2 of the system and signals from external Bluetooth devices 5 such as cellular phones capable of transmitting a Bluetooth signal. One advantage of this provision is the system's operability to have greater control over what signals trigger the disabling of the autonomous vehicle 3, allowing discretion as to balancing safety precautions with inefficiencies associated with unnecessary shutdowns.

In one embodiment, the transmitter 2 may at the same time be a receiver 4 that can be configured to alert the wearer that they are in range of the autonomous vehicle 3. This alert can include any number of mechanisms known in the art including audible, visible, and sensory notifications. For instance, the transmitter/receiver 2 could beep, flash a light, or vibrate to alert the user. In some embodiments, the transmitter 2 can include a button, switch, or other input to allow a user to acknowledge the notification, or to override the autonomous vehicle 3 shutdown temporarily. For example, the wearer could be given 2 seconds to activate the override function, which then triggers a time extension to move out of range of the autonomous vehicle 3. In an alternative embodiment, the override switch can be used to ignore that given transmitter 2 for given time period, for example for 1 hour. This switch could also be used proactively to temporarily disable a transmitter 2.

A preliminary check-in process may be provided that verifies the establishment of a Bluetooth connection between the transmitter 2 and the receiver 4 prior to carrying out any disabling process that is only triggered when the Bluetooth transmitter 2 reached a predefined proximity to the receiver 4. The check-in process can be performed while the transmitter 2 is still more remote from the autonomous vehicle 3 than the proximity that would trigger the disabling process. In a preferred embodiment, the transmitter 2 may also have some receiver 4 capabilities that are sufficient for receiving a verification signal verifying that a Bluetooth connection is established between the transmitter 2 and the receiver 4 and may be provided with signaling capabilities to provide an acoustic or optical signal verifying to a user establishment of such Bluetooth connection.

Figure 2A:
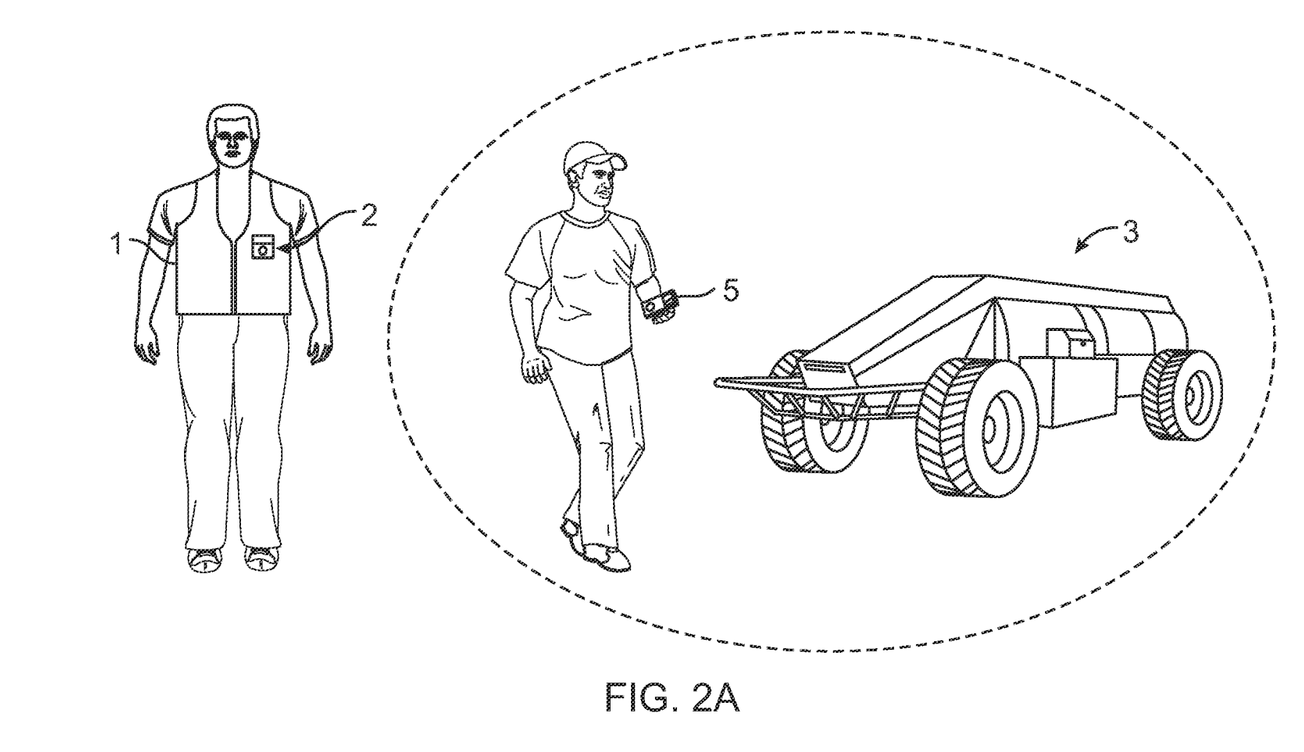
FIG. 2a shows a view of an example scenario featuring an external Bluetooth-enabled device in range of a receiver.
Figure 2B:
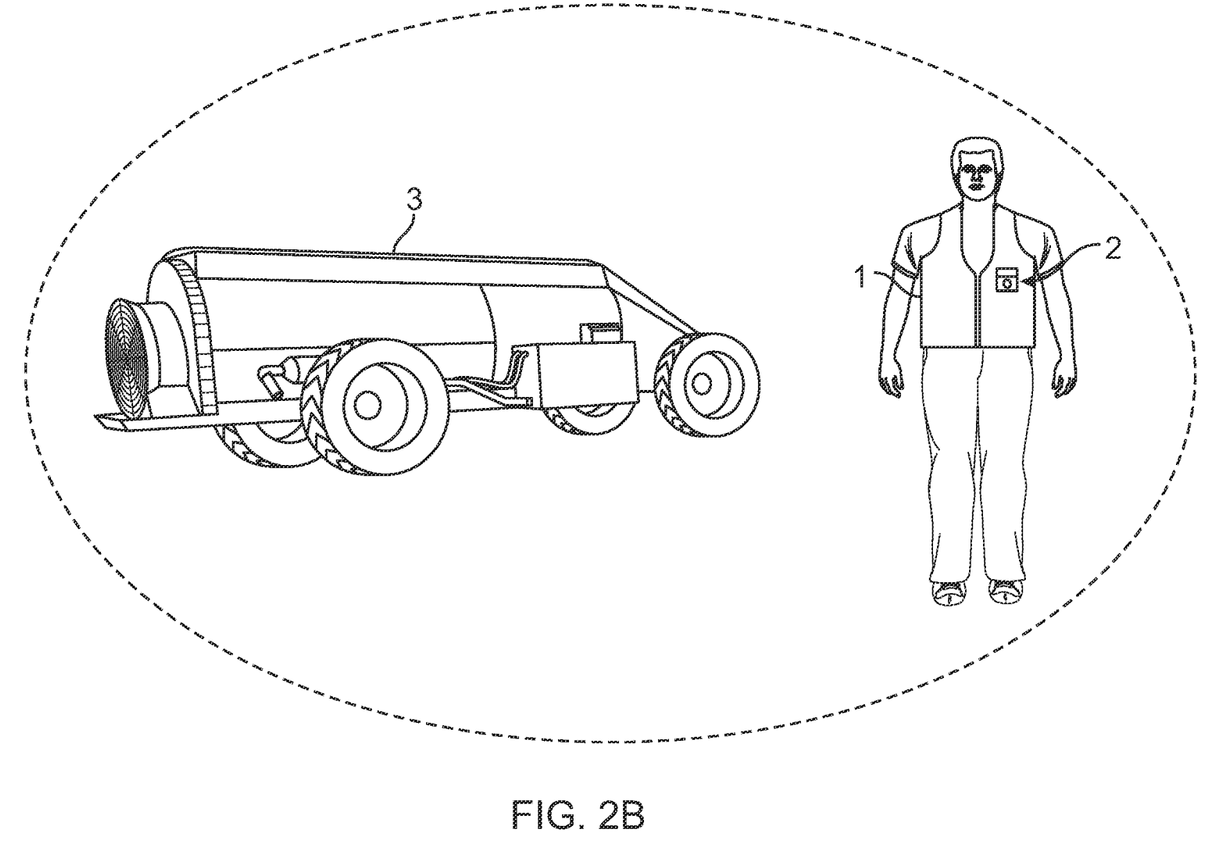
FIG. 2b shows a view of an example scenario featuring a transmitter in range of a receiver.

FIGS. 2a and 2b show example scenarios in which the safety system can operate. In the first example shown in FIG. 2a, the safety vest transmitter 2 is outside of the range of the receiver 4 (see FIG. 5) provided on the autonomous vehicle 3, but a different Bluetooth enabled device 5 is within range, which range is schematically demonstrated by the dashed line in FIG. 2a. Two distinct modes of operation are possible in such a scenario. In one embodiment, the receiver 4 can be configured to only trigger when the Bluetooth transmission signal transmits an identification name that corresponds to a transmitter 2 known to the system. This is advantageous to reduce the likelihood of inadvertent disabling by a third-party device. For example, in applications where there is pedestrian traffic in proximity of the autonomous vehicle 3, but adequate safeguards to prevent pedestrians from being in danger of being run over, it is desirable to disable the detection of devices external to the system. In another embodiment, the receiver 4 can be configured to trigger for signals from any Bluetooth device such as a phone, a truck, headphones, computers, or any number of Bluetooth enabled devices known in the art that transmit Bluetooth signals.

Most individuals carry some Bluetooth device on them almost all times of the day, providing a higher degree of protection to the public. This is particularly advantageous for protecting unsuspecting people not part of the team outfitted with safety vests. Providing additional safeguards to aid in the prevention of collision between the autonomous vehicle 3 and pedestrians greatly reduces risk of liability from an accident. This feature provides redundancy in the system, allowing workers to be protect in the event of battery failure, or if forgetting to wear the safety vest.

Operability to activate a disabling module for any Bluetooth signal also allows the autonomous vehicle 3 to avoid hitting some animals, as Bluetooth low energy tags are utilized with increasing regularity for dogs and livestock. This not only prevents injury to animals, but also prevents damage to the autonomous vehicle 3 that may arise out of a collision.

In a preferred embodiment, there is operability to select between the kind of signals that trigger the disabling module. For example, the system can be configured to only trigger a disabling module for transmitter and cell phone signals. This selection can be made via a user interface 13 for the network, which includes receiving a Bluetooth identification number.

FIG. 2b shows an embodiment of the receiver 4 scanning for and detecting a transmitter 2 within the system that is in range of the receiver 4. In this scenario, the autonomous vehicle 3 may immediately commence assuming the disabling mode, or alternatively may allow a user to manually override the disabling mode. In the latter case, the autonomous vehicle 3 continues proceeding on the path while the receiver 4 continues scanning for other signals.

It is advantageous that only the transmitter 2 triggering the disabling mode may be able to override it. If multiple transmitters trigger the disabling mode, all the transmitters triggering it should be required to override it.

A built-in delay is applied to make sure that an actual signal is detected, rather than a false signal. For example, the receiver 4 could sample at a 2 Hz frequency receiving a transmitter signal, or if the configuration is for filtering Bluetooth signals just from a specific designated transmitter 2, the transmitter may transmit Bluetooth signals at 2 Hz time intervals. Since autonomous vehicles 3 in fields such as agriculture, mining, and industry typically operate at low speeds, it is not as imperative that the shutdown be instantaneous, as is required in passenger vehicles. When a vehicle is accelerating from a standstill, it is preferred that no delay be built in, as to protect individuals who may be servicing the vehicle from below.

Figure 3:
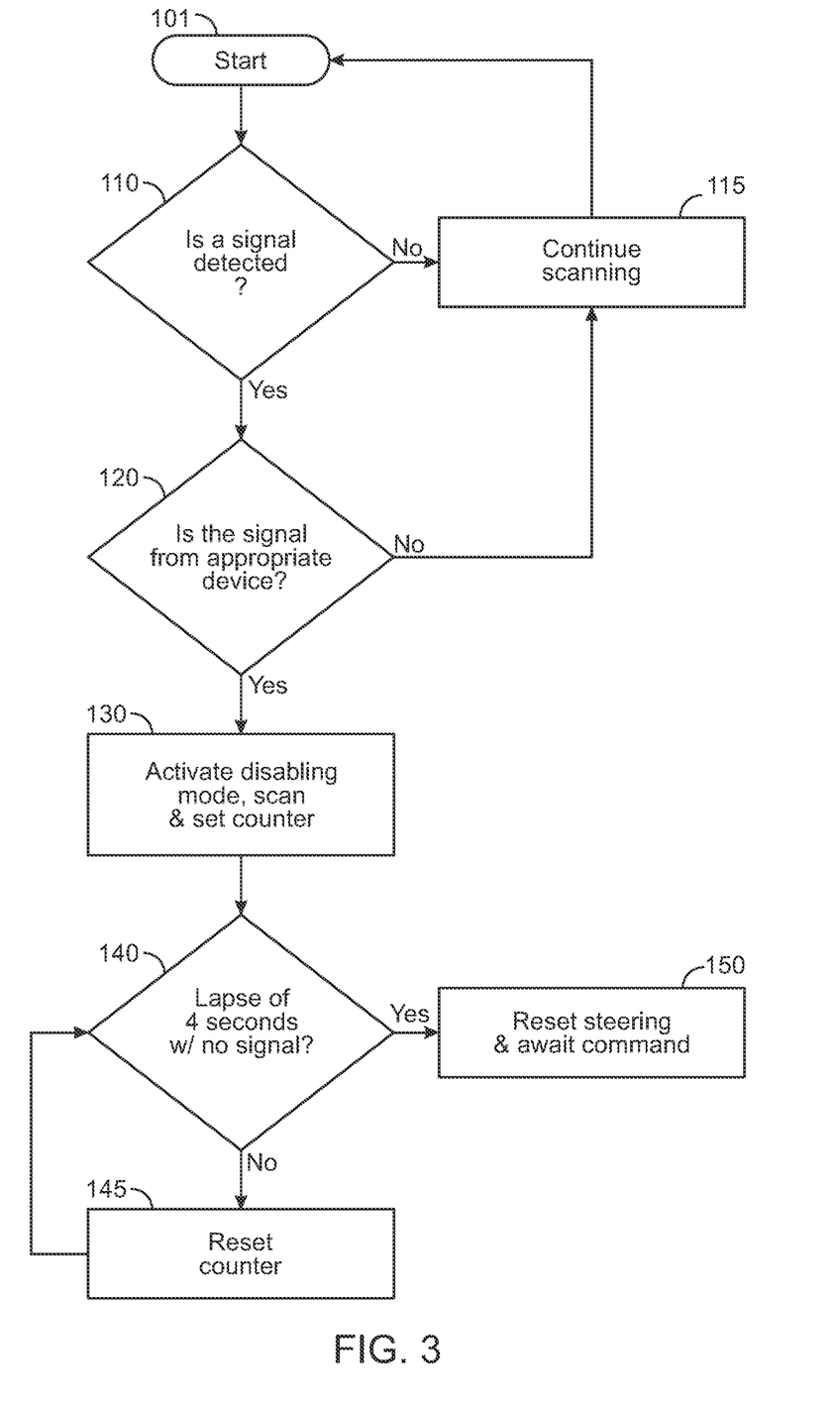
FIG. 3 shows a flowchart including the steps taken in triggering disabling mode.

FIG. 3 shows a flowchart depicting the logic steps of the operation of the triggering of a disabling module. Method step 101 comprises providing a transmitter 2 and a receiver 4 operable to scan for transmitter signals. Method step 110 involves evaluating whether a signal is detected by the receiver 4 within a defined range of the autonomous vehicle 3. If no signal is detected, the receiver 4 continues scanning in search of signals pursuant to method step 115. If a signal is detected, method step 120 calls for evaluating whether the signal was transmitted from an appropriate device. What constitutes an appropriate device can be selected or adjusted via, for example, a user interface 13. For instance, the system can be configured to only react to signals transmitted from Bluetooth devices with an identification number or code associated with the safety system. In an alternative embodiment, the system can be configured to react to any Bluetooth transmitted within the range of the receiver 4, even external devices such as cellphones or vehicles.

If the signal stems from a transmitter inconsistent with the settings, the receiver 4 ignores the signal and proceeds to continue scanning for appropriate signals. If the signal is appropriate according to the settings, the process proceeds to method step 130, which includes the activation of a disabling module and setting of a counter. In a preferred embodiment, the disabling module shifts the drive to neutral, applies brakes, locks steering in place, and displays a message on the user interface 13 notifying that the disabling module has been triggered. In other embodiments, the drive can be shifted to a different gear such as park. The receiver 4 continues to scan while in disabling mode to determine whether the transmitter 2 is still in close proximity to the autonomous vehicle 3.

When disabling mode is activated, a counter starts, determining the number of consecutive scans without signal detection. According to method step 145, if a signal continues to be detected, the counter resets to zero and restarts the count. Once a predetermined number of scans corresponding to a predetermined lapse of time is reached, the process proceeds to method step 150, in which the steering of the vehicle is reset, the notification on the user interface 13 is cleared, and the vehicle is ready to receive further commands.

Figure 4:
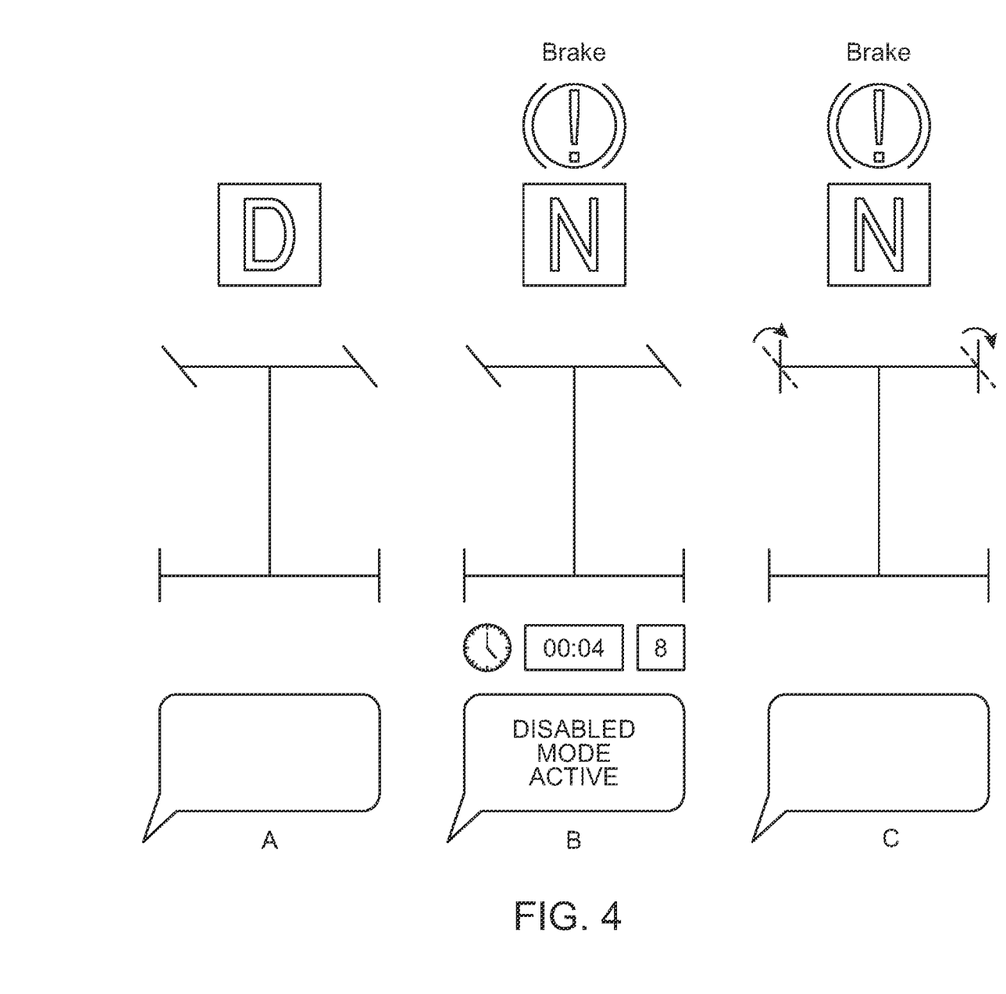
FIG. 4 shows a schematic diagram demonstrating operating modes of autonomous vehicle operation.

FIG. 4 demonstrates various operating modes of the autonomous vehicle following the detection of a transmitter signal starting from the operating mode when the vehicle is in an autonomous mode. Operating mode A represents an autonomous vehicle operating as normal. In this embodiment, the drive controls are set to drive, the vehicle is steering to the left, and the user interface 13 is blank. Operating mode B represents the effect of the disabling module, which is triggered upon the detection of a transmitter signal within the range of the receiver 4 of the autonomous vehicle. When the disabling module is activated, the brakes are applied, the drive controls are set to neutral, the steering is locked in place locking the wheels in the position they were in when the disabling module was triggered, and the user interface 13 displays a message to the user indicating that the autonomous vehicle has been disabled. The steering being locked in place until no transmitter signals are detected serves to prevent someone from being pinched as a result of the wheels pivoting while the autonomous vehicle stands still.

Once in the disabling mode, the receiver 4 continues to scan for transmitter signals. A counter tracks the scans and resets the counter every time a signal is detected. Once a predetermined number of consecutive scans are performed without detection of a transmitter signal, the vehicle enters operating mode C. In one embodiment, the predetermined number is 8 scans, corresponding to 4 consecutive seconds of no transmitter 2 being within range.

In operating mode C, the drive controls remain in neutral and the brakes continue to be applied. The user interface message is erased and the steering is reset such that the wheels are perpendicular to the axle. Once in operating mode C, the engine control unit 7 ECU is open to accept commands from the user or the autonomy controller 6. In one embodiment, an operator inputs the commands into a user interface 13 communicatively connected to the ECU.

Figure 5:
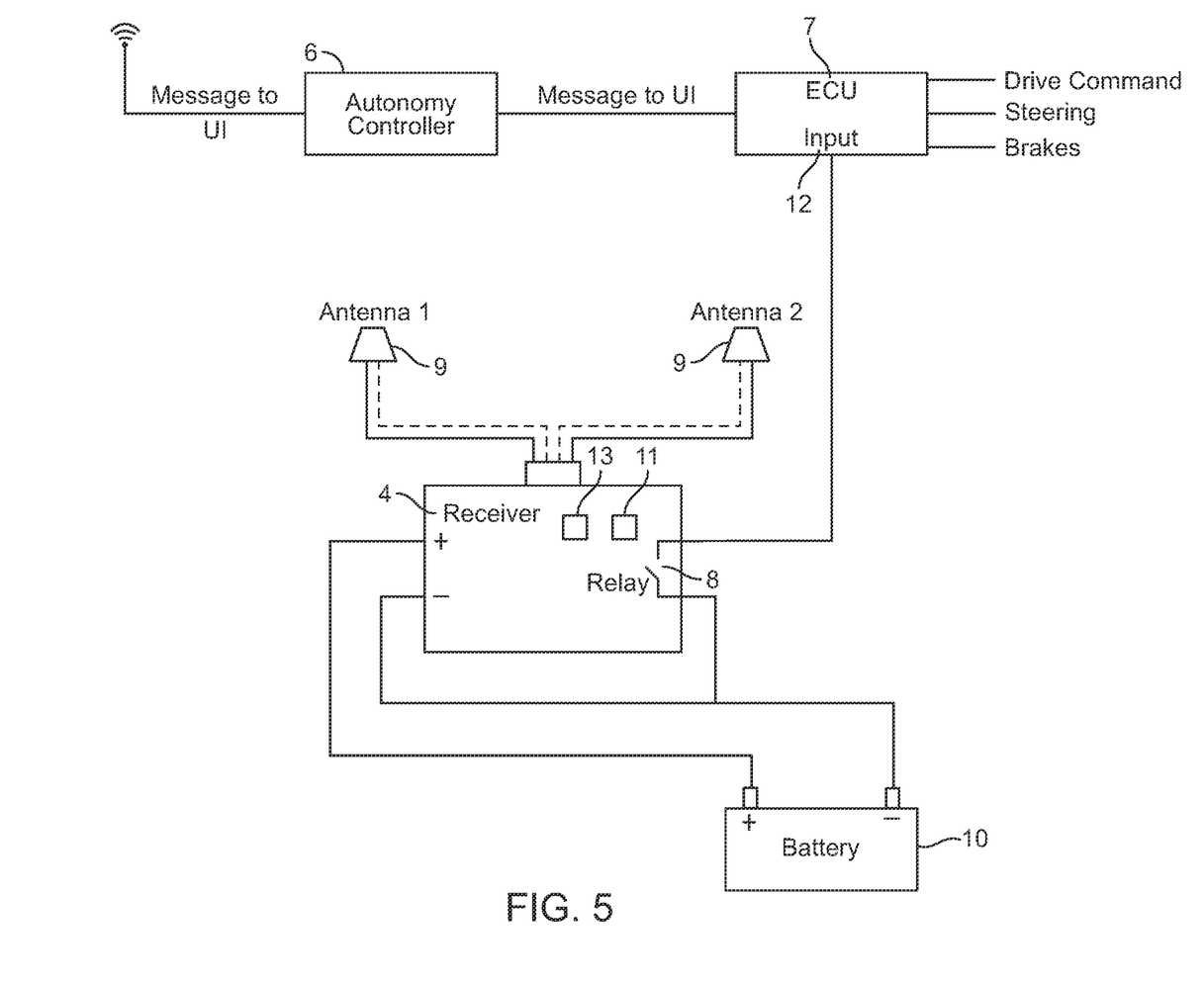
FIG. 5 shows a schematic view of circuitry related to the receiver.

FIG. 5 shows the components of the system installed on the autonomous vehicle, including the receiver 4.

In a preferred embodiment there is a plurality of antennas 9 that receive the signal transmitted by the transmitters. This signal is conveyed to the receiver 4, which is connected to a microcontroller 11 that is connected to a relay switch 8, in this embodiment a single relay switch 8. The microcontroller 11 is configured to run code to trigger the opening of the relay in the event a transmitted signal is detected by the receiver 4.

This serves as a fail-safe feature in the event of a broken wire or a malfunction in the relay. The relay can be a simple switch operable to provide a desired output by grounding it or running power through it. In a preferred embodiment the relay is grounded and attached to a sinking input 12 to the ECU, which is responsible for drive commands, steering, and brakes.

The ECU can operate in two modes: manual mode and autonomous mode. These modes can be toggled via a physical switch located on the autonomous vehicle. In manual mode, a human located remotely from the vehicle utilizes a physical controller to communicate with the ECU. Accordingly, the ECU only applies commands received from the physical remote controller, which could be implemented on a laptop or a mobile phone. In the autonomous mode, a controller 6 provides commands to the ECU without human input being required. These commands can be conveyed, for example, by means of controlled area network (CAN) messages. The autonomy controller 6 processes GPS and lidar data and communicates with a user interface 13.

While in the autonomous mode, the ECU is configured to employ a disabling module in the event of signal detection, wherein the drive control is set to neutral, steering is locked in place, and the brakes are applied.

Figure 6:
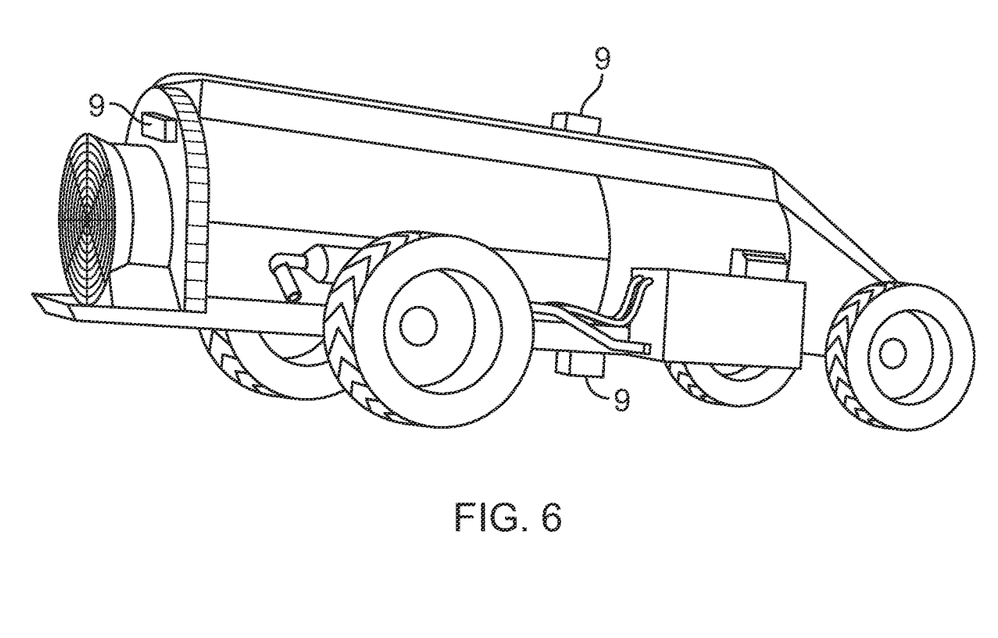
FIG. 6 shows an example antenna system placement of antennas located on the autonomous vehicle.

FIG. 6 shows an example configuration of antennas, collectively designated by the reference numeral 9, located on the autonomous vehicle. In one embodiment, antennas 9 can be provided on the top of the vehicle in the center, at the rear of the vehicle, and underneath an engine bay below the machine. The strategic placement insures a complete coverage of all areas surrounding the autonomous vehicle. The antenna 9 located underneath the autonomous vehicle 3 prevents the vehicle 3 from moving while someone is servicing the machine from the bottom, thus eliminating the risk of crushing. The antenna 9 located on top of the vehicle allows a substantially unobstructed path for signal reception, particularly suitable for monitoring the path ahead. In some applications such as autonomous vehicle orchard sprayers, it is advantageous to shut down operation when a person is in close proximity to the solutions including pesticide, which are emitted from the sprayer. The antenna 9 located at the rear of the vehicle can thus monitor signals transmitted from behind the autonomous vehicle, for instance to mitigate the risk of chemical exposure.

The antennas 9 can be directional, omni-directional, or a combination thereof. Accordingly, certain antennas 9 may be arranged to target a narrower angle at a greater range, while other antennas 9 may be configured to target 360 degrees but at a shorter range. The provision of multiple antennas 9 has the added benefit of providing redundancy in the system, such that if one antenna 9 fails, the other antennas 9 can still pick up a transmitted signal.

In a preferred embodiment the antennas 9 operate on a frequency of 2.4 GHz. Splitters can be utilized to add more antennas 9, or an antenna 9 array can be configured to maximize coverage. While it is advantageous for multiple antennas 9 to be provided to maximize Bluetooth coverage and avoid blind spots surrounding the vehicle, in other embodiments only one antenna 9 is required on the autonomous vehicle, preferably oriented in the direction of the path.

In one embodiment, the antennas 9 are rugged antennas, which are suitably durable to withstand wear and tear inherent to off-road travel, such as exposure to branches and other debris commonly found in an agricultural setting. Since these antennas 9 are oriented at various locations on the autonomous vehicle, including on top of and underneath the vehicle, it is particularly advantageous for the antennas 9 as a low height to reduce chances of snagging to elements such as branches. In a preferred embodiment the antennas 9 are constructed of a flexible material, which renders it less prone to serious damage than rigid antennas 9.

The following is a list of elements by reference numerals:
Safety vest 1
Transmitter 2
Autonomous vehicle 3
Receiver 4
Bluetooth device 5
Autonomy controller 6
ECU 7
Relay switch 8
Antennas 9
Battery pack 10
Microcontroller 11
Sinking input 12
User interface 13
Method steps 101, 110, 115, 120, 130, 140, 145, 150
Operating modes A, B, C The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings, although not every Figure may repeat each and every feature that has been shown in another Figure in order to not obscure certain features or overwhelm the Figure with repetitive indicia. It is understood that the invention is not limited to the specific methodology, devices, apparatuses, materials, applications, etc., described herein, as these may vary. It is also to be understood that the terminology used herein is used for the purpose of describing particular embodiments only, and is not intended to limit the scope of the invention.

What is claimed is:

1. An autonomous vehicle safety system comprising:
   an autonomous vehicle Bluetooth receiver that is connectable in a signal transmitting fashion to an engine control unit of an autonomous vehicle in the fields of agriculture, mining, and industry;
   at least one specific designated Bluetooth transmitter that is remote from the autonomous vehicle and communicatively coupled to the autonomous vehicle Bluetooth receiver and configured to send a specific designated Bluetooth transmitter signal to the autonomous vehicle Bluetooth receiver, wherein the autonomous vehicle Bluetooth receiver is configured to receive the specific designated Bluetooth transmitter signal up to a specified distance from the at least one specific designated Bluetooth transmitter; and
   at least one antenna that receives the specific designated Bluetooth transmitter signal and conveys it to the autonomous vehicle Bluetooth receiver, which is connected to a microcontroller that is connected to a relay switch, wherein the microcontroller is configured to run code to trigger the opening of the relay switch in the event a transmitted signal is detected by the autonomous vehicle Bluetooth receiver and the relay switch is grounded and attached to a sinking input to the engine control unit; wherein
   the microcontroller is further configured to trigger, upon receipt of the specific designated Bluetooth transmitter signal at the autonomous vehicle Bluetooth receiver and running code, applying brakes, shifting drive to neutral, and locking steering in place for the autonomous vehicle; and the microcontroller is configured to be triggered only by a signal from the at least one specific designated Bluetooth transmitter identified as part of the system by verifying a code transmitted by the at least one specific designated Bluetooth transmitter and received by the autonomous vehicle Bluetooth receiver.

2. The autonomous vehicle safety system of claim 1, wherein the at least one specific designated Bluetooth transmitter is embedded in a wearable garment.

3. The autonomous vehicle safety system of claim 1, wherein at least one of the at least one specific designated Bluetooth transmitter and the autonomous vehicle Bluetooth receiver includes a user interface allowing a user to input an override command.

4. The autonomous vehicle safety system of claim 1, wherein the at least one antenna is configured to be attached to one of the top, bottom, and rear of the autonomous vehicle.

5. A method of operating the autonomous vehicle safety system as defined in claim 1 for proximity-based disabling of the autonomous vehicle in the fields of agriculture, mining, and industry, said method comprising:
   (a) detecting by the autonomous vehicle Bluetooth receiver the specific designated Bluetooth transmitter signal emanating from the at least one specific designated Bluetooth transmitter that is remote from but within the specified distance to the autonomous vehicle;
   (b) determining receipt of the specific designated Bluetooth transmitter signal by verifying the code transmitted by the at least one specific designated Bluetooth transmitter and received by the autonomous vehicle Bluetooth receiver to determine whether the at least one specific designated Bluetooth transmitter transmitting the code is part of the system; and
   (c) upon determining that the specific designated Bluetooth transmitter signal was transmitted from the at least one specific designated Bluetooth transmitter that is part of the system, actuating the relay switch, disabling the engine control unit.

6. The method according to claim 5, further comprising a preliminary check-in process verifying that a Bluetooth connection is established between the at least one specific designated Bluetooth transmitter and the autonomous vehicle Bluetooth receiver prior to carrying out the method steps (a)-(c) upon receiving the specific designated Bluetooth transmitter signal when the transmitter reached a predefined proximity to the autonomous vehicle Bluetooth receiver.

7. The method according to claim 6, wherein the check-in process is conducted at a first point in time upon receiving a Bluetooth signal from the specific designated Bluetooth transmitter that is at that first point in time more remote from the autonomous vehicle Bluetooth receiver, than the specific designated Bluetooth transmitter is remote from the autonomous vehicle Bluetooth receiver at a second point in time after the first point in time when sending the specific designated Bluetooth transmitter signal triggering performance of steps (a)-(c) at the second point in time.

8. The method according to claim 6, wherein the at least one specific designated Bluetooth transmitter also has receiver capabilities for receiving a verification signal that the Bluetooth connection is established between the at least one specific designated Bluetooth transmitter and the autonomous vehicle Bluetooth receiver and provides an acoustic or optical signal verifying to a user establishment of such Bluetooth connection.

9. The method according to claim 6, wherein upon verification that the Bluetooth connection is established between the at least one specific designated Bluetooth transmitter and the autonomous vehicle Bluetooth receiver, the autonomous vehicle emits an acoustic or optical signal verifying to a user establishment of such Bluetooth connection.

* * * * *